United States Patent
Tetsumoto

(10) Patent No.: US 8,425,650 B2
(45) Date of Patent: Apr. 23, 2013

(54) METHOD FOR MANUFACTURING MOLTEN METAL

(75) Inventor: Masahiko Tetsumoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 80 days.

(21) Appl. No.: 12/989,347

(22) PCT Filed: Apr. 22, 2009

(86) PCT No.: PCT/JP2009/058000
§ 371 (c)(1),
(2), (4) Date: Oct. 22, 2010

(87) PCT Pub. No.: WO2009/131148
PCT Pub. Date: Oct. 29, 2009

(65) Prior Publication Data
US 2011/0036201 A1    Feb. 17, 2011

(30) Foreign Application Priority Data
Apr. 23, 2008 (JP) ................. 2008-112799

(51) Int. Cl.
*C22B 4/00* (2006.01)
*C22B 4/08* (2006.01)

(52) U.S. Cl.
USPC .......... 75/10.36; 75/10.4; 75/10.46; 75/10.59

(58) Field of Classification Search ........... 75/10.36, 75/10.4, 10.46, 10.59
See application file for complete search history.

(56) References Cited

U.S. PATENT DOCUMENTS

| | | | | |
|---|---|---|---|---|
| 3,385,494 A | * | 5/1968 | Themelis et al. | 75/10.5 |
| 4,661,150 A | * | 4/1987 | Bates et al. | 75/10.65 |
| 5,004,496 A | * | 4/1991 | Aune et al. | 75/10.28 |
| 5,681,367 A | | 10/1997 | Hunter | |
| 6,149,709 A | | 11/2000 | Uragami et al. | |
| 6,419,724 B1 | | 7/2002 | Monteyne | |
| 2003/0070507 A1 | | 4/2003 | Tokuda et al. | |

FOREIGN PATENT DOCUMENTS

| | | | |
|---|---|---|---|
| FR | 2619825 A1 | * | 3/1989 |
| JP | 64-62438 A | | 3/1989 |
| JP | 2000-513411 | | 10/2000 |

(Continued)

OTHER PUBLICATIONS

Machine translation of FR 2619825, published Mar. 1989.*

(Continued)

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

A method for manufacturing molten metal by using a stationary non-tilting electric furnace comprising: forming a raw material layer by charging a particular amount of a carbonaceous material and/or metal oxide agglomerates with carbonaceous material containing a nonvolatile metal element that forms molten metal into the furnace from the raw material charging chute, and having a sloping surface extending downward from the one end of the furnace toward the other end of the; subsequently forming an agglomerate layer on the sloping surface of the raw material layer by charging a particular amount of the metal oxide agglomerates with carbonaceous material into the furnace from the raw material charging chute; and subsequently forming a molten metal layer and a molten slag layer in the furnace by heating the lower end of the agglomerate layer with the heater.

13 Claims, 2 Drawing Sheets

FOREIGN PATENT DOCUMENTS

| | | |
|---|---|---|
| JP | 2001-515138 | 9/2001 |
| JP | 2001-525487 | 12/2001 |
| JP | 2003 105415 | 4/2003 |
| JP | 2003-183715 A | 7/2003 |
| JP | 2003183715 | 7/2003 |

OTHER PUBLICATIONS

International Search Report issued Aug. 11, 2009 in PCT/JP09/058000 Apr. 22, 2009.

U.S. Appl. No. 13/501,068, filed Apr. 9, 2012, Tetsumoto.
U.S. Appl. No. 13/500,790, filed Apr. 6, 2012, Tetsumoto.
Combined Taiwanese Office Action and Search Report Issued Aug. 29, 2012 in Patent Application No. 098113432 (with English and Japanese translation and English translation of Categories of Cited Documents).

\* cited by examiner

METHOD FOR MANUFACTURING MOLTEN METAL

CROSS-REFERENCE TO RELATED APPLICATIONS

This application is U.S. application Ser. No. 12/989,347 filed Oct. 22, 2010 which is a 371 of PCT/JP2009/058000 filed Apr. 22, 2009 and claims the benefit of Japanese patent application no. 2008-112799 filed Apr. 23, 2008, the content of which is incorporated herein by reference.

TECHNICAL FIELD

The present invention relates to a method for manufacturing molten metal by directly reducing and melting metal oxide agglomerates with carbonaceous material in an electric heating and melting furnace without conducting pre-reduction.

BACKGROUND ART

Various proposals have been made for new iron-making processes that substitute existing blast furnace and smelting reduction processes. These proposals relate to the molten metal manufacturing processes for obtaining molten metal, involving pre-reducing metal oxide agglomerates with carbonaceous material in a rotary hearth furnace to form reduced agglomerates and melting the reduced agglomerates in an arc furnace or a submerged arc furnace (e.g., refer to Patent Documents 1 to 4).

However, in the processes that use an electric arc as the melting furnace, the metallization of the reduced agglomerates must be maintained at a high level and the fines ratio must be retained at a low level to ensure: high melting efficiency, refractory protection, suppression of excessive foamy slag formation, and the like. Thus, according to these processes it has been difficult to increase the productivity of rotary hearth furnaces while maintaining higher metallization and retaining lower fines generation. The problem that the facility tends to be large in size is unresolved.

In contrast, according to the processes that use a submerged arc furnace as the melting furnace, the reduced agglomerates form layers in the submerged arc furnace, and damage on refractories and excessive foamy slag formation are less problematic; also limitations on the metallization and fines ratio of the reduced agglomerates are few, and the size of the rotary hearth furnaces can be made relatively smaller compared to the processes that use arc furnaces. However, according to these processes, it is difficult to effectively use the chemical energy of CO gas generated by the reduction of metal oxides remaining in the reduced agglomerates; hence, there remains a problem that the productivity cannot be sufficiently increased and the operation cost cannot be sufficiently reduced.

In methods for manufacturing molten metal using a submerged arc furnace it is possible to omit pre-reduction in a rotary hearth furnace and directly charge unreduced metal oxide agglomerates with carbonaceous material into the submerged arc furnace so that the pre-reduction step and the melting step are performed in the same furnace. However, when the metal oxide agglomerates with carbonaceous material contain volatile metal elements in addition to nonvolatile metal elements that form molten metal (in other words, when iron mill dust is used as the raw material metal oxide), the volatile metal elements that had been evaporated and removed from the reduced agglomerates in the lower region of the furnace re-condense in a low-temperature zone in the upper region of the furnace and circulate in the furnace by adhering to the reduced agglomerates or forming accretions on the furnace walls. Thus, it is possible that the volatile metal elements cannot be efficiently recovered from exhaust gas but also operational problems such as that the reduced agglomerates do not descend property may occur.

Accordingly, in the existing processes, two steps (a pre-reduction step using a rotary hearth furnace and a melting step using a melting furnace) must be provided irrespective of whether an arc furnace or a submerged arc furnace is employed as the melting furnace. These processes require equipment or facilities for transferring the reduced agglomerates from the rotary hearth furnace to the melting furnace as well as two exhaust gas processing lines, i.e., one for the rotary hearth furnace and one for the melting furnace. Thus, the facility cost increases, the thermal loss increases, and the energy consumption cannot be sufficiently decreased as total system or process.

RELATED ART DOCUMENT

Patent Document

[Patent Document 1] Japanese Unexamined Patent Application Publication (Translation of PCT application) NO. 2000-513411

[Patent Document 2] Japanese Unexamined Patent Application Publication (Translation of PCT application) NO. 2001-515138

[Patent Document 3] Japanese Unexamined Patent Application Publication (Translation of PCT application) NO. 2001-525487

[Patent Document 4] Japanese Unexamined Patent Application Publication (Translation of PCT application) NO. 2003-105415

DISCLOSURE OF INVENTION

The present invention has been made under such circumstances and aims provide a method for manufacturing molten metal using metal oxide agglomerates with carbonaceous material, according to which the facility cost and the energy consumption can be notably reduced compared to the existing processes.

One aspect of the present invention provides a method for manufacturing molten metal by using a stationary non-tilting electric furnace, the electric furnace including a raw material charging chute provided in one end of the furnace in the width direction, the raw material charging chute connecting to the interior of the furnace from the upper part of the furnace; an electrical heater for heating a position in the other end of the furnace in the width direction and in a lower position of the furnace in the height direction; and a secondary combustion burner provided at a furnace top and between the two ends of the furnace, the method comprising forming a raw material layer by charging a particular amount of a carbonaceous material and/or metal oxide agglomerates with carbonaceous material containing a nonvolatile metal element that forms molten metal into the furnace from the raw material charging chute and having a sloping surface extending downward from the one end at the upper side of the furnace interior toward the other end in the lower side of the furnace interior; subsequently forming an agglomerate layer on the sloping surface of the raw material layer by charging a particular amount of the metal oxide agglomerates with carbonaceous material into the furnace from the raw material charging chute; and subsequently forming a molten metal layer and a molten slag layer in the furnace by heating a lower end portion of the agglomerate layer with the heater while allowing the agglomerate layer to descend along the sloping surface of the raw material layer toward the lower end by melting; and concurrently thermally reducing the agglomerate layer by radiant heat from secondary combustion by blowing oxygen-containing gas into the furnace from secondary combustion burner to burn CO-containing gas generated from the agglomerate layer.

Another aspect of the present invention provides a method for manufacturing molten metal by using a stationary non-tilting electric furnace, the electric furnace including raw material charging chutes at both ends of the furnace in the furnace width direction and connecting to the furnace interior from the upper part of the furnace; an electrical heater which heats a lower position of the furnace in the height direction and is located between the raw material charging chutes at both ends of the furnace; and secondary combustion burners provided at a furnace top in the height direction and between the heater and the raw material charging chutes at the both ends of the furnace respectively, the method comprising: forming raw material layers by charging a particular amount of a carbonaceous material and/or metal oxide agglomerates with carbonaceous material containing a nonvolatile metal element that forms molten metal into the furnace from the raw material charging chutes and having a sloping surface extending downward from both ends of the furnace toward a lower position of the furnace interior to be heated with the heater; subsequently forming an agglomerate layer on each of the sloping surfaces of the raw material layer by charging a particular amount of the metal oxide agglomerates with carbonaceous material from the raw material charging chutes; and subsequently, forming a molten metal layer and a molten slag layer in the furnace by heating a lower end portion of the agglomerate layer with the heater while allowing the agglomerate layer to descend along the sloping surface of the raw material layer toward the lower end by melting; and concurrently thermally reducing the agglomerate layer by radiant heat from secondary combustion by blowing oxygen-containing gas into the furnace to burn CO-containing gas generated from the agglomerate layer.

Objects, features, aspects, and advantages of the present invention will become more apparent by the detailed description below and the drawings.

BEST MODES FOR CARRYING OUT THE INVENTION

The embodiments of the present invention will now be described in detail with reference to drawings.

Embodiments

Configuration of a Stationary Non-Tilting Electric Furnace

Figure 1:
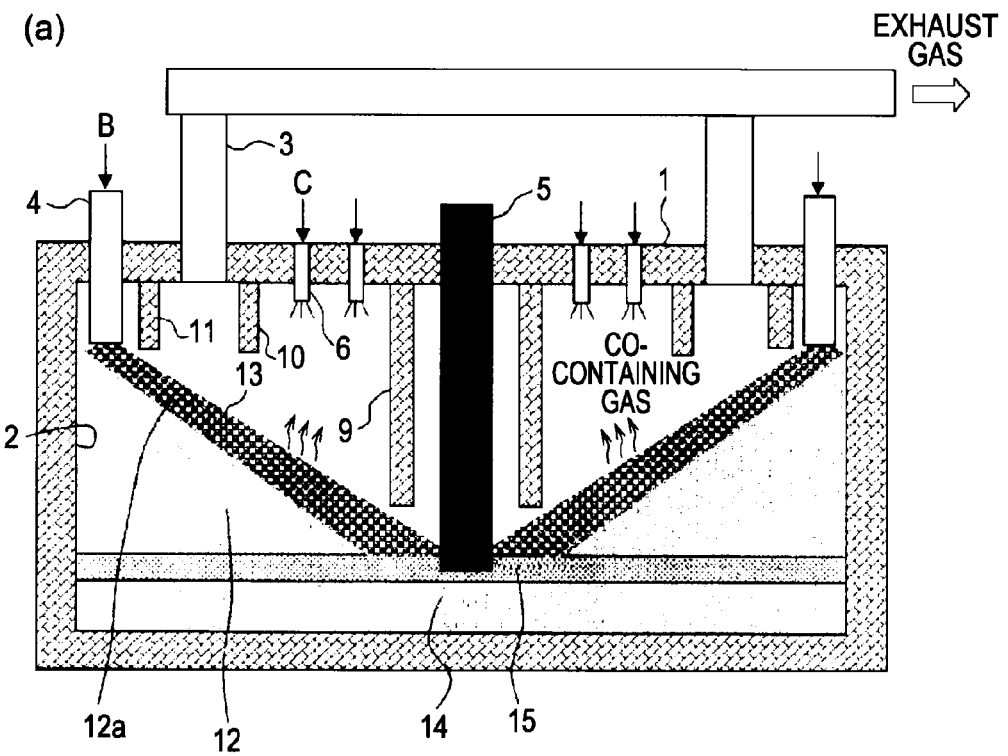
FIG. 1 shows an outline configuration of a stationary non-tilting arc furnace according to an embodiment, where (a) is a cross-sectional view in the width direction and (b) is a plan view.
Figure 1:
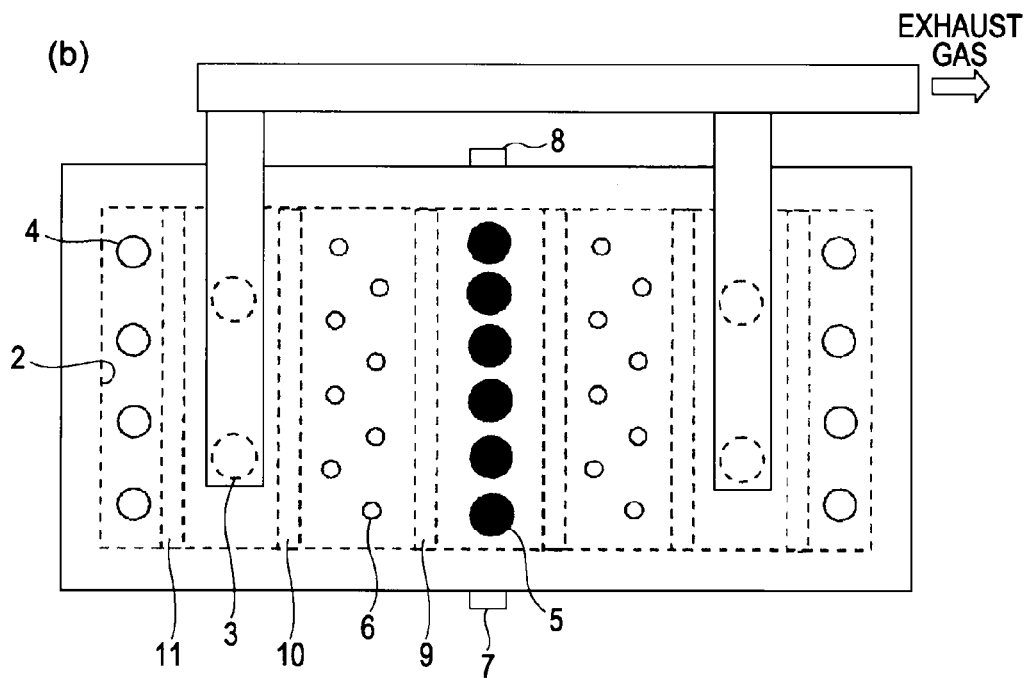

FIG. 1 shows an outline configuration of a stationary non-tilting electric furnace according to one embodiment of the present invention. The stationary non-tilting electric furnace (also simply referred to as "furnace" hereinafter) according to this embodiment is an arc furnace having a predominately rectangular shape in a horizontal cross-section. An exhaust gas duct 3 and raw material charging chutes 4 are connected to the furnace top (furnace ceiling 1 in this embodiment). Electrodes 5 that function as heaters are inserted through the furnace ceiling 1 into the furnace. The raw material charging chutes 4 are respectively provided near both end walls 2 of the furnace (one end portion and the other end portion) in the width direction while the electrodes 5 are provided in the center position of the furnace in the width direction. Secondary combustion burners 6 are provided at the furnace top (furnace ceiling 1).

The exhaust gas duct 3 is preferably provided closer to the raw material charging chutes 4 than to the electrodes 5. This is to suppress oxidizing exhaust gas after secondary combustion from flowing toward the electrodes 5 and to thereby suppress damage on the electrodes 5.

Partition walls 9, 10, and 11 that are suspended from the furnace ceiling 1 are preferably provided between the electrodes 5 and the secondary combustion burners 6, between the secondary combustion burners 6 and the exhaust gas duct 3, and between the exhaust gas duct 3 and the raw material charging chutes 4.

It is preferable to provide the partition walls 9 between the electrodes 5 and the secondary combustion burners 6 to prevent the oxidizing exhaust gas after secondary combustion from contacting the electrodes 5.

It is preferable to provide the partition walls 10 between the secondary combustion burners 6 and the exhaust gas duct 3 to prevent the exhaust gas after secondary combustion from short-cutting to the exhaust gas duct 3 and to transfer a sufficient amount of radiant heat to the agglomerate layer 13.

It is preferable to provide the partition walls 11 between the exhaust gas duct 3 and the raw material charging chutes 4 to prevent damage on the raw material charging chutes 4 caused by overheating with hot exhaust gas.

All or some of the partition walls 9, 10, and 11 may be installed by comprehensively considering the effects of partition installation, installation costs, and maintenance work, etc.

In the furnace bottom, a tap hole 7 and a slag tap hole 8 are preferably provided in furnace side walls in the furnace longitudinal direction perpendicular to the furnace width direction, e.g., in a central portion of the furnace in the width direction where the raw material charging chutes 4 are not provided (i.e., where raw material layers 12 are not provided in the furnace). This is to facilitate the hole-opening operation during the tapping of molten metal and the slag.

Common heat-exchangers (not shown) may be installed downstream of the exhaust gas duct 3 to recover the sensible heat of the hot exhaust gas discharged from the furnace and to efficiently utilize the recovered sensible heat as the energy for generating electricity for the arc or other uses, e.g. for drying pellets B, etc.

The electrodes 5 are preferably of a three-phase alternating current type that is excellent in terms of heat efficiency and commonly used in steel-making electric arc furnaces. For example, a configuration of six electrodes can be employed, which consists of three pairs of each single phase constituted by a three-phase electrode.

Tip portions of the electrodes 5 are preferably positioned (submerged) in the agglomerate layer 13 or a molten slag layer 15, described below, while conducting the melting operation. As a result, the melting can be accelerated by the effects of radiant heat and resistance heat by arcs, and the damage on the inner surface of furnace walls which are not protected with the raw material layer 12 can be suppressed.

Hereinafter, as an example the case in which this stationary non-tilting arc furnace is used with coal as the raw material for forming the raw material layer in the furnace, and carbon composite iron oxide pellets as the metal oxide agglomerates with carbonaceous material stacked on the raw material layer, is described below.

[Method for Manufacturing Molten Metal]

A particular amount of coal A is charged from the raw material charging chutes 4 installed at both end walls 2 of the furnace in the width direction. The coal A forms a carbonaceous material layer 12 having a sloping surface 12a extending downward from both end walls 2 toward the lower end portions of the electrodes 5. The size distribution of the coal A is preferably adjusted according to the size of carbon composite iron oxide pellets B described below so that the carbon composite iron oxide pellets B do not penetrate into gaps in the carbonaceous material layer 12.

Next, carbon composite iron oxide pellets (also simply referred to as "pellets" hereinafter) B as the agglomerates with carbonaceous material are continuously or intermittently charged from the raw material charging chutes 4 installed near both end walls 2 of the furnace in the width direction so as to form a pellet layer 13 as an agglomerate layer on the sloping surface 12a of the carbonaceous material layer 12. The amount of the carbonaceous material contained in the pellets B may be determined on the basis of the theoretically required C amount for reducing iron oxide to metallic iron, and the target C concentration of molten iron. The pellets B are preferably dried in advance so that they do not burst when charged into the furnace.

As described above, the heights of the electrodes 5 are preferably adjusted in advance so that the lower end portions thereof are submerged in the pellet layer 13.

As electricity is supplied to the electrodes to conduct arc heating, the pellets B near the lower end portion of the pellet layer 13 become sequentially reduced, melted, and separate into molten iron by being rapidly heated, i.e., form and separate into a molten iron layer 14 and a molten slag layer 15 on the furnace bottom. Preferably, a CaO source or a MgO source such as limestone or dolomite is mixed into the pellets B in advance to adjust the basicity or the like of the molten slag layer 15.

The pellets B sequentially melt from near the lower end portion of the pellet layer 13 as described above, the agglomerate layer 13 starts to sequentially descend the furnace by gravity toward the lower end portions of the electrodes 5 along the sloping surface of the carbonaceous material layer. Even if some of the pellets in the pellet layer 13 penetrate into gaps in the carbonaceous material layer 12, such pellets will be thermally reduced and melted since they stay in the furnace for a long time and will not cause any problem since they separate into molten iron and molten slag and drop onto the molten iron layer 14 and the molten slag layer 15 on the furnace bottom through gaps in the carbonaceous material layer 12.

As the pellets in the pellet layer 13 approach electrodes 5, the pellets are efficiently heated by radiant heat and resistance heat generated by arcs from the electrodes 5, the iron oxide inside the pellets is pre-reduced to solid metallic iron by the carbonaceous material contained in the pellets, and CO-containing gas (combustible gas) is generated. When a carbonaceous material, such as coal, having a volatile component is used as the carbonaceous material to be contained in the pellets, the volatile component evaporated from this carbonaceous material by heating is also added to the CO-containing gas.

The CO-containing gas is burned (secondary combustion) by oxygen-containing gas, e.g., oxygen gas, blown from the secondary combustion burners 6 installed in the furnace ceiling 1 and generates radiant heat. This radiant heat also heats the pellet layer 13. As the pellet layer 13 is heated as described above, iron oxide in the pellet layer 13 is pre-reduced to solid metallic iron and CO-containing gas is generated the same as in the case of radiant heating and resistance heating with arcs from the electrodes 5; thus, radiant heating by the secondary combustion is further accelerated.

The pellets B charged into the furnace from the raw material charging chutes 4 are pre-reduced in a solid state by radiant heating caused by the secondary combustion (also referred to as "secondary combustion heat") as they descend the sloping surface 12a of the carbonaceous material layer 12 until the metallization becomes higher, then they are melted by arc heat and resistance heat near the lower end portions of the electrodes 5, and are separated into molten iron and molten slag.

Accordingly, the iron oxide concentration in the molten slag generated near the lower end portions of the electrodes 5 becomes sufficiently low and wear of the electrodes 5 can be suppressed.

The carbonaceous material remaining in the pellets is dissolved into the molten iron to thereby form molten iron having a target C concentration.

The molten iron and molten slag manufactured as such can be intermittently discharged from the tap hole 7 and the slag tap hole 8 in the furnace bottom in the same manner as tapping methods for blast furnaces, for example.

On the other hand, the carbonaceous material layer 12 formed by charging the coal A in the furnace at the initial stage is gradually heated in the furnace to have the volatile component therein removed, and turns into char or coke. The volatile component removed is burned with oxygen-containing gas blown from the secondary combustion burners 6 along with the carbon monoxide (CO)-containing gas generated from the pellet layer 13 and efficiently used as the energy for radiantly heating the pellet layer 13. As described above, since carbon (C) in the carbonaceous material contained in the pellets B is balanced for the reduction of iron oxide in the pellets and carburization of molten iron, the charred or coked layer as carbonaceous material layer 13 theoretically remains unconsumed. However, in actual operation, the carbonaceous material layer is gradually consumed in the course of a long-term operation by direct reduction reactions with the pellets penetrating into the carbonaceous material layer 12, and by the carburization reaction for molten iron. The amount the carbonaceous material layer 12 in the furnace can be maintained by the following operation every once in a particular operation period: continue arc heating operation at least for a predetermined period of time while stopping the feed of pellets B from the raw material charging chutes 4 so as to substantially melt the pellet layer 13 in the furnace and to expose the sloping surface 12a of the carbonaceous material layer 12. Then a predetermined amount of coal (carbonaceous material) A is charged from the raw material charging chutes 4 while discontinuing the arc heating and secondary combustion.

Since the inner faces of the two side walls in the furnace width direction are covered with the carbonaceous material layer, the wear of the refractories in such portions is significantly suppressed. Accordingly, high-quality refractories having superb wear resistance and water-cooling structures are only needed for the two side walls in the furnace longitudinal direction that are not covered with the carbonaceous material layer, thus achieving significant facility cost reduction.

(Alternatives)

As for the arrangement of the raw material charging chutes 4 and the electrodes 5 in the aforementioned embodiment, an example in which the raw material charging chutes 4 are installed near both end walls 2 of the furnace in the width direction and the electrodes 5 are installed in the central position of the furnace ceiling 1 is described; however, the raw material charging chutes 4 may be installed in one end of the furnace in the width direction and the electrodes 5 may be installed in the other end portion (the other of the end portions) in the furnace width direction. When this modification is employed, the slope of the carbonaceous material layer 12 that is formed in the furnace is provided on one side only. This is a disadvantage from the viewpoint of refractory protection compared to the aforementioned embodiment; however, there are also advantages in that the furnace width can be reduced and thus the facility can be made more compact.

In the aforementioned embodiment, an example of using an arc furnace as an electric furnace is described; however, the furnace is not limited to this and any furnace that conducts heating with electrical energy, such as a submerged arc furnace, an electromagnetic induction heating furnace, or the like, can be employed. In the arc furnace, electrodes can be used as the heaters. In the electromagnetic induction heating furnace, solenoid heating coils can be used as the heaters.

In the aforementioned embodiment, an example in which the exhaust gas duct 3 and the raw material charging chutes 4 are connected to the furnace ceiling portion 1 is described. However, the arrangement is not limited to this and one or both of the exhaust gas duct 3 and the raw material charging chutes 4 may be connected to upper portions of the furnace side walls. In the case where the raw material charging chutes 4 are connected to the upper portions of the furnace side walls, the raw material charging chutes 4 are automatically installed in end portions in the furnace width direction.

In the aforementioned embodiment, an example in which the stationary non-tilting arc furnace has a substantially rectangular shape in a horizontal cross-section is described, but the shape is not limited to this. For example, a furnace having a round or substantially elliptical cross-section may be used. In such a case, three electrodes may be employed for a three-phase power supply instead of the 3 pairs of single-phase electrodes. However, when the furnace with a substantially rectangular cross-section is used, there is an advantage that the scale of the furnace can be easily increased by extending the furnace in the longitudinal direction (the direction perpendicular to the furnace width direction) without changing the furnace width.

In the aforementioned embodiment, an example in which carbon composite iron oxide pellets are used as the metal oxide agglomerates with carbonaceous material B is described, but this example is not limiting. Alternatively, carbon composite metal chloride agglomerates containing a metal chloride instead of a metal oxide may be used, or carbon composite metal compound agglomerates containing a plurality of metal compounds such as metal oxides and metal chlorides may be used.

In the aforementioned embodiment, an example in which only iron, i.e., a nonvolatile metal element, is contained in the metal oxide agglomerates with carbonaceous material B is described. Alternatively, in addition to the nonvolatile metal element, volatile metal elements, e.g., Zn, Pb, and the like, may be contained. In other words, steel mill dust containing volatile metal elements can be used as the metal oxide raw material in the agglomerates B. Volatile metal elements evaporate from the metal oxide agglomerates with carbonaceous material B by being heated in the furnace. In the present invention, since the oxygen-containing gas supplied from the secondary combustion burners 6 installed in the furnace top burns the CO gas in the furnace, the temperature in the furnace top can be maintained sufficiently high. Thus, re-condensation of the volatile metal elements evaporated from the metal oxide agglomerates with carbonaceous material B can be assuredly prevented in the furnace top and the volatile metal elements can be efficiently recovered from the exhaust gas discharged from the furnace.

In this specification, a "volatile metal element" refers to a metal element in an elemental form or a compound form such as a salt, having a melting point of 1100° C. or less at 1 atm. Examples of the elemental metal include zinc and lead. Examples of the compound of the volatile element include sodium chloride and potassium chloride. The volatile metals in the compounds are reduced to metals in an electric furnace (e.g., an arc furnace or a submerged arc furnace) and part or all of the volatile metals are present in a gas state in the furnace. The chlorides of volatile metal elements are heated in the electric furnace and part or all of the chlorides are present in a gas state in the furnace. In contrast, a "nonvolatile metal element" refers to a metal element in an elemental form or a compound form such as an oxide, having a melting point of more than 1100° C. at 1 atm. Examples of the elemental metal include iron, nickel, cobalt, chromium, and titanium. Examples of the oxides of the nonvolatile metals include $CaO$, $SiO_2$, and $Al_2O_3$. When an arc furnace or a submerged arc furnace is used as the electric furnace, the compounds of the nonvolatile metal elements can exist in a gas state near the arcs in the furnace (arc temperature region) by taking form of reduced elemental metals or unreduced compounds, but exist in a liquid or solid state in a region remote from the arcs.

Although pellets are used as an example of the metal oxide agglomerates with carbonaceous material B in the aforementioned embodiment, briquettes may be employed. Since briquettes have a greater angle of repose than spherical pellets, the furnace height must be increased in order to secure the residence time on the sloping surface 12a of the carbonaceous material layer 12 compared to the case of using pellets, but there is an advantage that the furnace width can be reduced.

Although only iron (Fe) is used as an example of the nonvolatile metal element constituting the metal oxide agglomerates with carbonaceous material B and the molten metal 14 in the aforementioned embodiment, nonferrous metals such as Ni, Mn, Cr, and the like may be contained in addition to Fe.

In the aforementioned embodiment, adding the CaO source or MgO source to the metal oxide agglomerates with carbonaceous material B in advance is described as an example of the means for adjusting the basicity of the molten slag. Alternatively, limestone or dolomite may be charged from the raw material charging chutes 4 together with the metal oxide agglomerates with carbonaceous material B instead of or in addition to such means.

Although coal is described as an example of a carbonaceous material constituting the carbonaceous material layer 12 serving as the raw material layer in the aforementioned embodiment, coke may be used. Since coke is already devolatilized and does not generate volatile components in the furnace, coke is less likely to burst than coal although contribution to the secondary combustion is reduced. Thus, there is an advantage in that the scattering loss can be reduced.

The metal oxide agglomerates with carbonaceous material B may be used for forming the carbonaceous material layer 12 in addition to or instead of the carbonaceous material such as coal or coke. When the metal oxide agglomerates with carbonaceous material B are used as the raw material for forming the carbonaceous material layer 12, although reduction and melting occurs in the portion that comes in contact with the molten iron, heat does not readily conduct to portions far from the portion contacting the molten iron, and the metal oxide agglomerates with carbonaceous material B remain in a solid state. Thus, the carbonaceous material layer 12 once formed remains in a layer state for a long time. Moreover, since the temperature in the carbonaceous material layer 12 decreases as the distance from the region contacting the molten iron increases and the distance to the furnace wall decreases, damage on the refractory caused by formation of molten FeO does not pose a problem.

In the aforementioned embodiment, an example in which the secondary combustion burners 6 are installed in only the furnace ceiling portion is described. However, the secondary combustion burners 6 may be additionally installed in the side wall upper portions in the longitudinal direction or, when the furnace length is small, they may be installed only in side wall upper portions in the longitudinal direction.

In the aforementioned embodiment, an example in which the tap hole 7 and the slag tap hole 8 are formed in different side walls opposing each other is described. However, the tap hole 7 and the slag tap hole 8 may be installed in the same side surface or the slag tap hole 8 may be omitted and only the tap hole 7 may be formed so that the molten iron and the molten slag can be discharged through the tap hole 7.

In the aforementioned embodiment, an example of using the raw material charging chutes 4 having raw material feeding ports at a fixed height in the furnace is described. Alternatively, raw material charging chutes that can charge raw materials at different positions in the height direction in the furnace can be used.

Figure 2:
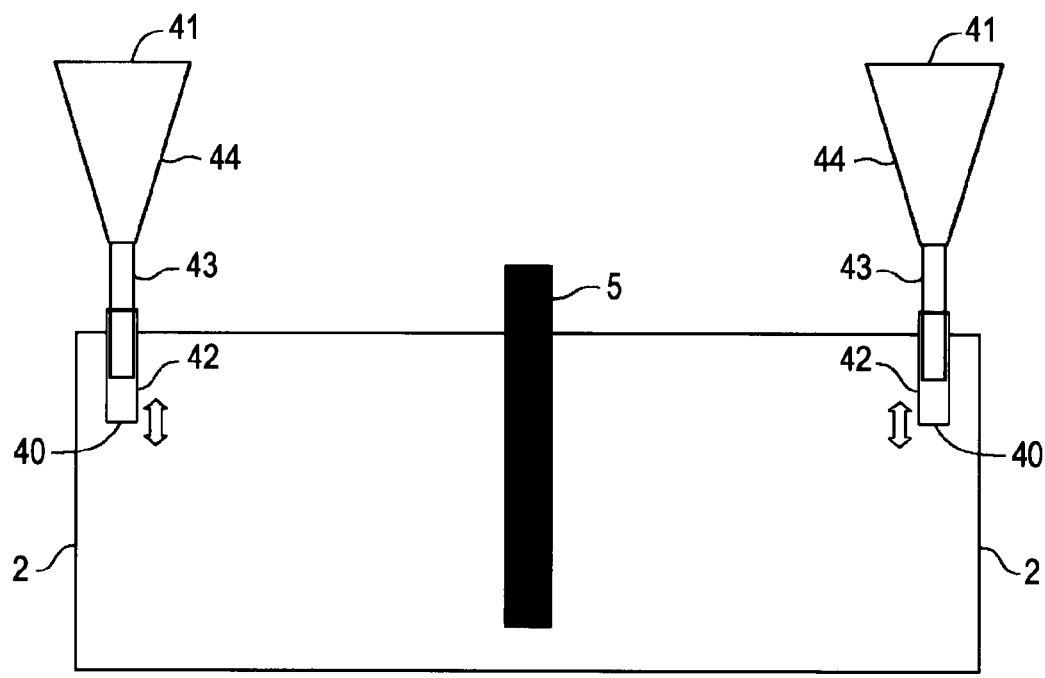
FIG. 2 is a schematic cross-sectional view in the width direction showing movements of raw material feeding ports of raw material charging chutes having outer chutes equipped to the stationary non-tilting arc furnace.

To be more specific, as shown in FIG. 2, raw material charging chutes 41 equipped with outer chutes 42 having raw material feeding ports 40 that can be moved in vertical directions are preferably used. Each raw material charging chute 41 includes a hopper 44 for storing the raw material, an inner chute 43 connected to the hopper 44, and an outer chute 42 that can slide in the vertical direction on the inner chute 43. The lower end portion of the agglomerate layer 13 can be adjusted to come at an appropriate position by moving the outer chutes 42 in vertical direction according to the angle of repose of the metal oxide agglomerates with carbonaceous material and the carbonaceous material.

When the raw material charging chutes 41 that can charge raw material at positions with different heights in the furnace are used as the raw material charging chutes and, for example, the raw material to be charged is changed to a raw material having a different angle of repose, the distance between the lower end of the agglomerate layer 13 and the heating sections of the heaters (the lower ends in the cases where electrodes 5 are used as the heaters) can be adjusted to a particular distance by moving the raw material feeding ports in vertical directions. Compared to the case where the raw material charging chutes 4 having the raw material feeding ports with a fixed height in the furnace are used, the melting characteristics and the thermal efficiency can be further optimized.

To be more specific, when the raw material is changed to one having a greater angle of repose and the distance between the lower end of the agglomerate layer 13 and the heating sections of the heaters starts to increase, the outer chutes 42 (raw material feeding ports 40) can be lifted upward so as to prevent the lower end portion of the agglomerate layer 13 from being excessively distant from the heating sections of the heaters. As a result, the excess increase in slag temperature and in exhaust gas temperature caused by radiant heat can be prevented. Moreover, in the case where the ceiling of the electric furnace is cooled with water, the increase in the cooling outlet water temperature can be prevented. In contrast, when the raw material is changed to one having a smaller angle of repose, the distance between the lower end of the agglomerate layer 13 and the heating sections of the heaters becomes smaller. Thus, the contact between the lower end of the agglomerate layer 13 and the heating sections of the heaters can be prevented by moving the outer chutes 42 (raw material feeding ports 40) downward. Consequently, even when the metallization of the raw material is low, wear of the electrodes caused by the reaction between oxygen in FeO and the graphite serving as the electrode material can be prevented.

When operation is conducted under a constant voltage condition, the electric current may be monitored and the outer chutes 42 may be moved downward once the increase in current is detected so that the distance between the lower end of the agglomerate layer 13 and the heating sections of the heater can be increased and the increase in current and abnormal wear of the electrodes can be prevented.

The distance between the lower end of the pellet layer 13 and the heating sections of the heaters can be monitored using the exhaust gas temperature, the ceiling temperature, the cooling water temperature, the slag temperature, and with cameras or the like. When electrodes are used as the heaters, the amount of wear of the electrodes and the inter-electrode resistance can be used for the monitoring.

As has been described in detail above, one aspect of the present invention involves a method for manufacturing molten metal by using a stationary non-tilting electric furnace and such electric furnace includes: a raw material charging chute provided in one end of the furnace in the width direction and connected to the interior of the furnace from the upper part of the furnace; an electrical heater which heats a position in the other end of the furnace in the width direction and in a lower portion in a furnace height direction; and a secondary combustion burner is provided at the furnace top and between the two ends of the furnace. The method comprising: forming a raw material layer by charging a particular amount of a carbonaceous material and/or metal oxide agglomerates with carbonaceous material containing a nonvolatile metal element that forms molten metal into the furnace from the raw material charging chute having a sloping surface extending downward from one end of the furnace toward the other end of the furnace; subsequently forming an agglomerate layer on the sloping surface of the raw material layer by charging a particular amount of the metal oxide agglomerates with carbonaceous material into the furnace from the raw material charging chute; and subsequently forming a molten metal layer and a molten slag layer in the furnace by heating a lower end portion of the agglomerate layer with the heater while allowing the agglomerate layer to descend along the sloping surface of the raw material layer toward the lower end portion by the melting; and concurrently thermally reducing the agglomerate layer by radiant heat from secondary combustion by blowing oxygen-containing gas into the furnace to burn CO-containing gas generated from the agglomerate layer.

Another aspect of the present invention involves a method for manufacturing molten metal by using a stationary non-tilting electric furnace, and such electric furnace includes: raw material charging chutes at both ends of the furnace in the width direction and connecting to the furnace interior from the upper part of the furnace; an electrical heater which heats a lower position in a furnace height direction and is located between the raw material charging chutes at both ends of the furnace; and secondary combustion burners provided at the furnace top in the height direction and between the heater and the raw material charging chute. The method comprising: forming a raw material layers by charging a particular amount of a carbonaceous material and/or metal oxide agglomerates with carbonaceous material containing a nonvolatile metal element that forms molten metal into the furnace from the raw material charging chutes and having a sloping surface extending downward from both ends of the furnace toward a lower position of the furnace interior to be heated with the heater; subsequently forming an agglomerate layer on each of the sloping surfaces of the raw material layer by charging a particular amount of the metal oxide agglomerates with carbonaceous material from the raw material charging chutes; and subsequently, forming a molten metal layer and a molten slag layer in the furnace by heating a lower end portion of the agglomerate layer with the heater while allowing the agglomerate layer to descend along the sloping surface of the raw material layer toward the lower end by melting; and concurrently thermally reducing the agglomerate layer by radiant heat from secondary combustion by blowing oxygen-containing gas into the furnace to burn CO-containing gas generated from the agglomerate layer.

In the present invention, the lower end of the agglomerate layer is heated with a heater and melted so that CO-containing gas that is generated from the agglomerate layer is burned with oxygen-containing gas blown from a secondary combustion burner and the agglomerate layer can be heated with the radiant heat therefrom and be pre-reduced while allowing the unmelted portion of the agglomerate layer to move toward the lower end of the agglomerate layer, i.e., near the heating section of the heater, along the sloping surface of the raw material layer. The pre-reduced agglomerate layer is then reduced and melted near the heating section of the heater to form molten metal. Thus, molten metal can be directly obtained from unreduced metal oxide agglomerates with carbonaceous material. Accordingly, compared to existing processes, the facility cost and the energy consumption can be notably reduced. Moreover, since the combustion heat generated by the secondary combustion burner keeps the temperature in the furnace top at a sufficiently high level, re-condensation of volatile metal elements that had been evaporated can be prevented in the case where the metal oxide agglomerates with carbonaceous material contain the volatile metal elements.

In these manufacturing methods, when heating is conducted with the heater, the metal oxide agglomerates with carbonaceous material are preferably continuously or intermittently charged into the furnace from the raw material charging chute and, in the agglomerate layer, the metal oxide agglomerates with carbonaceous material located in the lower end of the agglomerate layer are preferably sequentially melted. The molten metal can be continuously manufactured by continuously or intermittently charging the metal oxide agglomerates with carbonaceous material.

In these manufacturing methods, the electric furnace preferably further includes an exhaust gas duct and when the metal oxide agglomerates with carbonaceous material further contain a volatile metal element, the volatile metal is preferably separated and recovered from the exhaust gas discharged through the exhaust gas duct. As a result, the volatile metal element removed by evaporation can be efficiently recovered from the exhaust gas discharged from the furnace through the exhaust gas duct.

In these manufacturing methods, an arc furnace in which the heater is an electrode inserted into the furnace from above the furnace and the lower end of the heater is arc-heated by electrification can be used as the electric furnace. The lower end portion of the electrode is preferably submerged in the agglomerate layer or the molten slag layer to conduct arc-heating. As a result, the melting can be accelerated by the effects of radiant heat by arcs and resistance heat, and the damage on the inner surface of furnace wall which are not protected with the raw material layer can be suppressed.

In these manufacturing methods, in the furnace top of the electric furnace, the distance between the exhaust gas duct and the raw material charging chute is preferably shorter than the distance between the exhaust gas duct and the electrode. When the distance between the exhaust gas duct and the raw material charging chute is shorter than the distance between the exhaust gas duct and the electrode, the possible region in which secondary combustion of combustible gas generated by being heated with the electrode is possible made wider, and the oxidizing exhaust gas after secondary combustion flows toward the exhaust gas duct, thereby suppressing damage on the electrode caused by exhaust gas flowing toward the electrode.

In these manufacturing methods, the electric furnace preferably further includes a partition wall provided between the exhaust gas duct and the raw material charging chute and is suspended in the furnace. This partition wall prevents damage on the raw material charging chute by being overheated with hot exhaust gas.

In these manufacturing methods, the electric furnace preferably further includes a partition wall provided between the electrode and the secondary combustion burner and is suspended in the furnace. This partition wall can prevent the oxidizing exhaust gas after secondary combustion from contacting the electrode.

In these manufacturing methods, the electric furnace preferably further includes a partition wall provided between the secondary combustion burner and the exhaust gas duct and suspended in the furnace. This partition wall prevents the exhaust gas after secondary combustion from short-cutting to the exhaust gas duct and thus a sufficient amount of radiant heat can be transferred to the agglomerate layer.

In these manufacturing methods, the raw material is preferably charged from a position that is suited for that raw material. Preferably, the height of the raw material feeding port of the raw material charging chute is changed according to the angle of repose of the raw material. For example, the raw material charging chute may include an outer chute having a raw material feeding port that can be moved in vertical directions. In this manner, the distance between the lower end of the agglomerate layer and the heating section of the heater can be maintained at an appropriate distance by changing the height of the raw material feeding port by moving the outer chute of the raw material charging chute in vertical direction according to the angle of repose of the raw material. Thus, the melting characteristics or the thermal efficiency can be optimized. For example, when an electrode inserted into the arc furnace (electric furnace) from above the furnace is used as the heater and when the metal oxide agglomerates with carbonaceous material are changed from briquettes to pellets having a smaller angle of repose, the outer chute can be moved downward to melt the pellets most effectively and adjust the distance between the electrode and the lower end of the pellet layer (agglomerate layer). As a result, the melting of the pellets can be optimized without increasing the energy consumption and without abnormally wearing the electrode.

INDUSTRIAL APPLICABILITY

According to the manufacturing methods of the present invention, molten metal can be manufactured while notably reducing the facility cost and the energy consumption compared to the existing methods for manufacturing molten metal.

The invention claimed is:

1. A method for manufacturing molten metal in a stationary non-tilting electric furnace, the furnace comprising:
    at least one raw material charging chute;
    at least one electrical heater; and
    at least one secondary combustion burner;
    wherein:
    the furnace has a first end and a second end opposite from the first end in a width dimension;
    the furnace has a top end and a bottom end in a height dimension;
    the raw material charging chute is positioned to dispense raw material into the furnace in proximity to the first end and the top end;
    the electrical heater is positioned to heat contents of the furnace in proximity to the second end and the bottom end; and
    the secondary combustion burner is positioned to combust contents of the furnace by blowing an oxygen-containing gas into a space in the furnace between a sloped surface of an agglomerate layer and the top end;
    comprising:
    forming a raw material layer by charging a raw material into the furnace from the raw material charging chute, the raw material layer having a surface that slopes from the first end and the top end to the second end and the bottom end;
    forming the agglomerate layer by charging an agglomerate material into the furnace from the raw material charging chute on to the raw material layer; and
    forming a molten metal layer and a molten slag layer in the furnace by concurrently:
        heating the agglomerate layer with the electric heater in proximity to the second end and the bottom end, causing the agglomerate layer to melt and descend the sloped surface of the raw material layer; and
        blowing the oxygen-containing gas into the space in the furnace between the sloped surface of the agglomerate layer and the top end with the secondary combustion burner to burn CO-containing gas generated by the agglomerate layer and further heat the agglomerate layer with radiant heat;
    wherein:
    the raw material comprises at least one of a carbonaceous material and metal oxide agglomerates with carbonaceous material comprising a nonvolatile metal element that forms molten metal; and
    the agglomerate material comprises metal oxide agglomerates with carbonaceous material comprising a nonvolatile metal element that forms molten metal.

2. The method for manufacturing molten metal according to claim 1, comprising charging the agglomerate material into the furnace continuously or intermittently while heating the agglomerate layer with the electric heater.

3. The method for manufacturing molten metal according to claim 1, wherein:
    the furnace further comprises an exhaust gas duct for discharging exhaust gas generated in the furnace; and
    the exhaust gas duct is positioned at the top end of the furnace.

4. The method for manufacturing molten metal according to claim 3, wherein:
    the agglomerate material further comprises a volatile metal element; and
    the method further comprises separating and recovering the volatile metal element from the exhaust gas discharged through the exhaust gas duct.

5. The method for manufacturing molten metal according to claim 3, wherein the furnace further comprises a partition wall suspended in the furnace in a location between the exhaust gas duct and the raw material charging chute in the width dimension.

6. The method for manufacturing molten metal according to claim 3, wherein the furnace further comprises a partition wall suspended in the furnace in a location between the secondary combustion burner and the exhaust gas duct in the width dimension.

7. The method for manufacturing molten metal according to claim 1, wherein:
    the electric heater comprises an electrode inserted into the furnace from the top end of the furnace; and
    a lower end of the heater is arc-heated by electrification.

8. The method for manufacturing molten metal according to claim 7, wherein, when forming the molten metal layer and the molten slag layer, a lower end portion of the electrode is submerged in the agglomerate layer or the molten slag layer to conduct arc-heating.

9. The method for manufacturing molten metal according to claim 7, wherein a distance between the exhaust gas duct and the raw material charging chute in the width dimension is shorter than a distance between the exhaust gas duct and the electrode in the width dimension.

10. The method for manufacturing molten metal according to claim 7, wherein the furnace further comprises a partition wall suspended in the furnace in a location between the electrode and the secondary combustion burner in the width dimension.

11. The method for manufacturing molten metal according to claim 1, wherein forming the raw material layer comprises charging the raw material into the furnace at different positions in the height dimension.

12. The method for manufacturing molten metal according to claim 11, wherein the raw material charging chute comprises an outer chute having a raw material feeding port that can be moved in the height dimension.

13. A method for manufacturing molten metal in a stationary non-tilting electric furnace, the furnace comprising:
    at least a first raw material charging chute and a second raw material charging chute;
    at least one electrical heater; and
    at least one secondary combustion burner;
    wherein:
    the furnace has a first end and a second end opposite from the first end in a width dimension;
    the furnace has a top end and a bottom end in a height dimension;
    the first raw material charging chute is positioned to dispense raw material into the furnace in proximity to the first end and the top end;
    the second raw material charging chute is positioned to dispense raw material into the furnace in proximity to the second end and the top end;

the electrical heater is positioned to heat contents of the furnace in between the first end and the second end in proximity to the bottom end; and the secondary combustion burner is positioned to combust contents of the furnace by blowing an oxygen-containing gas into a space in the furnace between sloped surfaces of a first agglomerate layer and a second agglomerate layer and the top end;

the method comprising:

forming a first raw material layer by charging a raw material into the furnace from the first raw material charging chute, the first raw material layer having a surface that slopes from the first end and the top end to a location between the first end and the second end at the bottom end;

forming a second raw material layer by charging the raw material into the furnace from the second raw material charging chute, the second raw material layer having a surface that slopes from the second end and the top end to a location between the first end and the second end at the bottom end;

forming the first agglomerate layer by charging an agglomerate material into the furnace from the first raw material charging chute on to the first raw material layer;

forming the second agglomerate layer by charging the agglomerate material into the furnace from the second raw material charging chute on to the second raw material layer; and forming a molten metal layer and a molten slag layer in the furnace by concurrently:

heating the first and second agglomerate layers with the electric heater between the first end and the second end in proximity to the bottom end, causing the first and second agglomerate layers to melt and descend along the sloped surfaces of the first and second raw material layers; and blowing the oxygen-containing gas into the space in the furnace between the sloped surface of each of the first and second agglomerate layers and the top end with the secondary combustion burner to burn CO-containing gas generated by the first and second agglomerate layers and further heat the first and second agglomerate layers with radiant heat;

wherein:

the raw material comprises at least one of a carbonaceous material and metal oxide agglomerates with carbonaceous material comprising a nonvolatile metal element that forms molten metal; and the agglomerate material comprises metal oxide agglomerates with carbonaceous material comprising a nonvolatile metal element that forms molten metal.

* * * * *